UNITED STATES PATENT OFFICE.

WILLIAM O. CROCKER AND WILLIAM P. CROCKER, OF TURNER'S FALLS, MASS.

PROCESS OF MAKING BISULPHITES.

SPECIFICATION forming part of Letters Patent No. 339,975, dated April 13, 1886.

Application filed September 24, 1885. Serial No. 178,031. (No specimens.)

*To all whom it may concern:*

Be it known that we, WILLIAM O. CROCKER and WILLIAM P. CROCKER, both of Turner's Falls, in the county of Franklin and State of Massachusetts, have invented certain new and useful Improvements in Preparing Bisulphite-of-Sodium Liquor for Pulping Wood or other Vegetable Fiber, of which the following is a full, clear, and exact description.

This invention relates to a new and improved method of preparing bisulphite-of-sodium liquor for reducing vegetable structures for obtaining cellulose, and also for other purposes.

In carrying out our invention we proceed as follows: Crude acid sulphate of sodium is roasted to liberate one proportion of sulphuric acid, which may be absorbed or condensed to be decomposed to furnish sulphurous acid, which is to be used later on. If desired, the acid sulphate can be brought in solution and then neutralized by adding oxide or carbonate of calcium or magnesium. In the neutral sulphate-of-sodium solution prepared by any of the above or other means is suspended by agitation an equivalent of neutral sulphite of calcium, and sulphurous-acid gas is introduced until decomposition has taken place and the mixture becomes saturated with the acid. The sulphuric acid, at first in combination with the sodium, is through the reaction transposed to the calcium, leaving the bisulphite of sodium in solution, the sulphate of calcium being precipitated. After the mixture has been allowed to settle, the liquor can be decanted or otherwise separated from the precipitated sulphate of calcium, and is then ready for use.

The sulphurous acid used in the operation can be procured by decomposing the sulphuric acid, as set forth, or by burning sulphur, or by other suitable means.

The neutral sulphite of calcium is preferably obtained by treating the used bisulphite-of-sodium liquor with oxide or carbonate of calcium, which absorbs one proportion of the sulphurous acid, and is precipitated as neutral sulphite of calcium. This, when suspended in the sulphate-of-sodium solution, requires but one-half of the sulphurous-acid gas to be supplied to bring about the required decomposition that is necessary when oxide or carbonate of calcium is used, thus making fresh liquors with less expenditure of time and material.

Should a comparatively weak liquor be required, the oxide carbonate or neutral sulphite of sodium may be suspended in water and treated with sulphurous acid until dissolved wholly or partially, and then the neutral sulphate of sodium added in a dry state, crystallized, or in solution. Liquors containing only from four to six per cent. of sulphurous acid can thus be prepared.

By the use of sulphate-of-sodium solution as a medium in which to suspend the calcium compounds used to first absorb the sulphurous acid introduced to bring about the desired decomposition we are enabled to produce the bisulphite-of-sodium liquors of any strength, even to saturation.

A sulphate-of-sodium solution testing 8° Baumé will, when decomposed and charged, produce a bisulphite-of-sodium liquor of 12° Baumé. This fact may be used as a test in the practical preparation of the liquors.

Sulphate of sodium being the source from which we derive the sodium base enables us to prepare the bisulphite-of-sodium liquor at much less expense than by the use of caustic or carbonated soda.

We avoid the presence of lime or calcium compounds in the digesters in which the substance is to be treated, as such liquors do not thoroughly reduce vegetable structures and have various injurious effects on the fibers.

We are aware that sulphates have been converted into sulphites and bisulphites by means of calcium oxide or carbonate in the presence of sulphurous acid. This method is, however, objectionable, as the reaction that takes place results in a troublesome deposit being formed, which coats and clogs the apparatus, and interferes with a uniform and rapid action of the sulphurous acid.

Having thus fully described our invention, we claim as new and desire to secure by Letters Patent—

1. The herein-described method of producing bisulphite-of-sodium liquor, consisting in suspending by agitation neutral sulphite of calcium in neutral sulphate-of-sodium solution, and then charging the mixture with sulphurous acid until decomposition has taken place, as set forth.

2. The herein-described method of obtaining bisulphite-of-sodium liquor, consisting in roasting the acid sulphate of sodium to reduce it to neutral sulphate and recover one proportion of sulphuric acid, suspending neutral sulphite of calcium in the neutral sulphate-of-sodium solution, and finally charging the mixture with sulphurous acid, as specified.

3. The herein-described method of obtaining bisulphite-of-sodium liquor from crude acid sulphate of sodium, consisting in roasting the crude sulphate of sodium to reduce it to a neutral sulphate and recover one proportion of sulphuric acid, treating the neutral solution with sulphite of calcium suspended by agitation, and charging with sulphurous acid obtained by decomposing the sulphuric acid recovered, as specified.

4. The herein-described process of obtaining bisulphite-of-sodium liquor, consisting in suspending by agitation neutral sulphite of calcium obtained by treating the used bisulphite-of-sodium liquor with oxide or carbonate of calcium in a neutral sulphate-of-sodium solution, and then charging the mixture with sulphurous acid until decomposition has taken place, as specified.

WILLIAM O. CROCKER.
WILLIAM P. CROCKER.

Witnesses:
FRANK H. BROWN,
HENRY D. BARDWELL.